(12) United States Patent
Huang et al.

(10) Patent No.: US 8,374,385 B2
(45) Date of Patent: Feb. 12, 2013

(54) METHOD OF EMBEDDING INFORMATION IN INPUT IMAGE, METHOD OF EXTRACTING INFORMATION FROM INPUT IMAGE, AND RELATED APPARATUS

(75) Inventors: Ying-Jieh Huang, Taipei County (TW); Po-Yu Peng, Taipei (TW); Sheng-Ping Wang, Tai-Tung Hsien (TW)

(73) Assignee: Primax Electronics Ltd., Neihu, Taipei (TW)

( * ) Notice: Subject to any disclaimer, the term of this patent is extended or adjusted under 35 U.S.C. 154(b) by 365 days.

(21) Appl. No.: 12/818,169

(22) Filed: Jun. 18, 2010

(65) Prior Publication Data
US 2011/0243374 A1 Oct. 6, 2011

(30) Foreign Application Priority Data

Apr. 2, 2010 (TW) ................................ 99110272 A

(51) Int. Cl.
*G06K 9/00* (2006.01)
*H04N 1/40* (2006.01)
(52) U.S. Cl. .................. 382/100; 382/286; 358/3.23
(58) Field of Classification Search .................. 382/100, 382/103, 112–116, 135–140, 155, 162, 168, 382/173, 181, 190, 193, 219, 232, 233–240, 382/254, 274, 276, 305, 312, 286; 713/176; 1/1; 358/1.9, 1.5, 3.23; 715/234
See application file for complete search history.

(56) References Cited

U.S. PATENT DOCUMENTS

| | | | | |
|---|---|---|---|---|
| 5,819,289 A | * | 10/1998 | Sanford et al. | 1/1 |
| 6,285,775 B1 | * | 9/2001 | Wu et al. | 382/100 |
| 6,992,797 B1 | * | 1/2006 | Sharma et al. | 358/1.9 |
| 7,054,461 B2 | * | 5/2006 | Zeller et al. | 382/100 |
| 7,558,961 B2 | * | 7/2009 | Sharma et al. | 713/176 |
| 7,693,297 B2 | * | 4/2010 | Zhang et al. | 382/100 |

* cited by examiner

*Primary Examiner* — Seyed Azarian
(74) *Attorney, Agent, or Firm* — Winston Hsu; Scott Margo

(57) ABSTRACT

A method of embedding information in an input image, wherein the information includes a plurality of characters, includes: utilizing a processing circuit to receive the information and convert each character included in the information into a corresponding symbol according to a conversion lookup table; setting a position of the corresponding symbol of each character in a data block according to a sequence look-up table to generate the data block; and adding at least the data block to the input image.

20 Claims, 12 Drawing Sheets

METHOD OF EMBEDDING INFORMATION IN INPUT IMAGE, METHOD OF EXTRACTING INFORMATION FROM INPUT IMAGE, AND RELATED APPARATUS

BACKGROUND OF THE INVENTION

1. Field of the Invention

The present invention relates to image processing, and more particularly, to methods of embedding information in an input image, extracting information from an input image, and apparatus thereof.

2. Description of the Prior Art

For general printing technology, users have to encrypt printed documents to ensure confidentiality and prevent important documents from being copied or exploited. In conventional technology, pixels within an image are modified provided those modifications are not easily noticeable to the human eye. For example, the lowest bit values of pixels or a number of pixels in conjunction with a special pixel position arrangement are adjusted. Conventional technology, however, usually has a very small information capacity or requires a large amount of computation at the expense of readability of documents to achieve the aforementioned goals. How to ensure the confidentiality of documents easily and quickly is still a significant topic in this field.

Furthermore, for some conventional technologies, encrypted information is distributed around the whole image of the document. After the document is cut, the encryption can not function properly upon the cut document since the document is no longer intact.

SUMMARY OF THE INVENTION

One of the objectives of the present invention therefore is to provide an easy and quick method of embedding/extracting information from an input image of a document without affecting the readability of the document.

According to a first embodiment of the present invention, an exemplary method of embedding information in an input image is provided, wherein the information includes a plurality of characters. The exemplary method comprises the following steps: utilizing a processing circuit to receive the information and convert each character included in the information into a corresponding symbol according to a conversion look-up table; setting a position of the corresponding symbol of each character in a data block according to a sequence look-up table to generate the data block; and adding at least the data block to the input image.

According to a second embodiment of the present invention, an exemplary method of extracting an information from an input image is provided, wherein the information comprises a plurality of characters, the input image comprises at least one data block having a plurality of symbols, each symbol comprises a specific symbol unit for indicating a position of the symbol, and the data block comprises a plurality of specific symbols for indicating a position of the data block. The exemplary method comprises the following steps: performing a foreground removing procedure for the input image to derive a background image; determining a range of at least the data block in the background image according to the specific symbols; deriving a symbol sequence of the symbols corresponding to the information according to a sequence look-up table and the specific symbols; and utilizing a processing circuit to convert the symbols to the corresponding characters according to a conversion look-up table and the symbol sequence, respectively.

According to a third embodiment of the present invention, an exemplary apparatus of embedding information in an input image is provided, wherein the information includes a plurality of characters. The exemplary apparatus comprises: a processing circuit, for receiving the information and converting each character included in the information into a corresponding symbol according to a conversion look-up table; a data block generating circuit, coupled to the processing circuit, for setting a position of the corresponding symbol of each character in a data block according to a sequence look-up table to generate the data block; and an output circuit, coupled to the data block generating circuit, for adding at least the data block to the input image.

According to a fourth embodiment of the present invention, an exemplary apparatus of extracting an information from an input image, wherein the information comprises a plurality of characters, the input image comprises at least one data block each having a plurality of symbols, each symbol comprises a specific symbol unit for indicating a position of the symbol, and the data block comprise a plurality of specific symbols for indicating a position of the data block. The exemplary apparatus comprises: a background generating circuit, for performing a foreground removing procedure for the input image to derive a background image; a data block position circuit, coupled to the background generating circuit, for determining a range of at least the data block in the background image according to the specific symbols; a symbol position circuit, coupled to the data block generating circuit, for deriving a symbol sequence of the symbols corresponding to the information according to a sequence look-up table and the specific symbols; and a processing circuit, coupled to the symbol position circuit, for converting the symbols to the corresponding characters according to a conversion look-up table and the symbol sequence, respectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
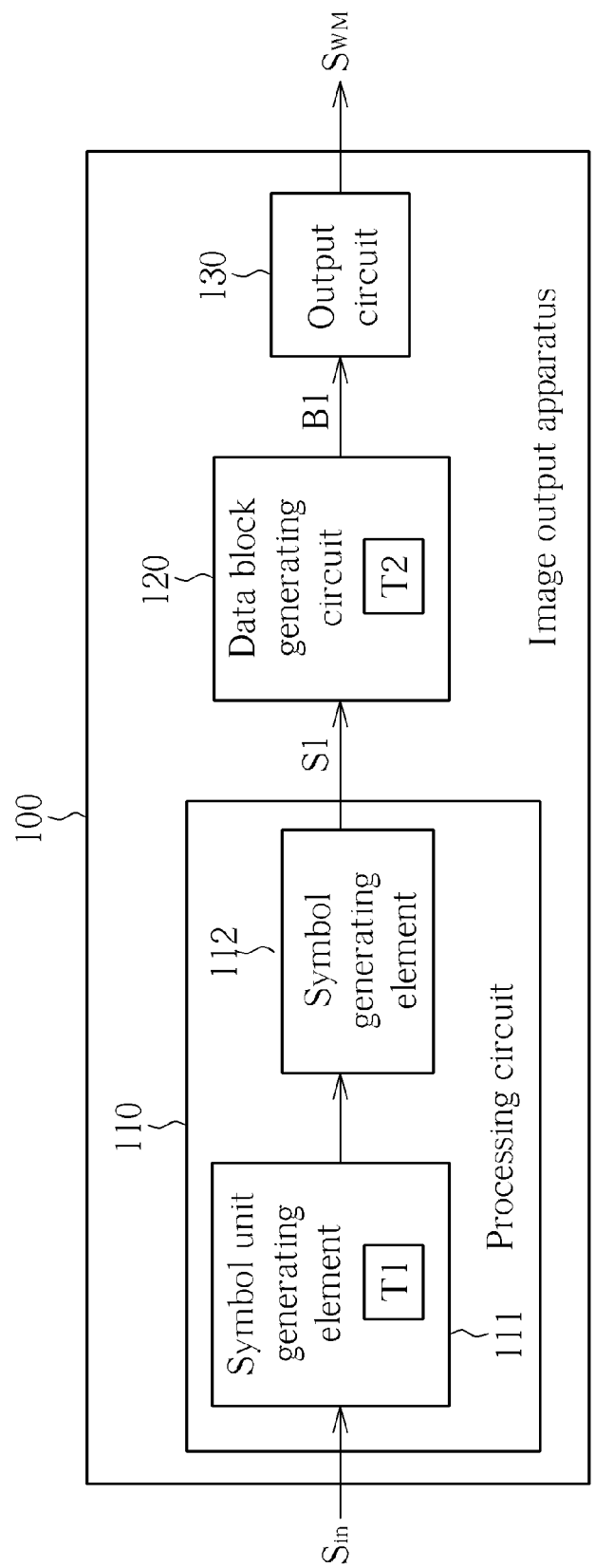
FIG. 1 is a diagram of an image output apparatus according to an embodiment of the present invention.

Please refer to FIG. 1, which is a diagram of an image output apparatus 100 according to an embodiment of the present invention. The image output apparatus 100 includes a processing circuit 110, a data block generating circuit 120 and an output circuit 130. The processing circuit 110 receives an input information $S_{in}$, and converts each character included in the information $S_{in}$ into a corresponding symbol S1 according to a conversion look-up table T1. In this embodiment, the conversion look-up table T1 is an American Standard Code for Information Interchange (ASCII) table. However, this is not supposed to be a limitation to the present invention since any codes capable of representing characters can be utilized to realize the conversion look-up table T1. The data block generating circuit 120 determines a size of a data block B1 according to a length of the input information $S_{in}$, and applies a sequence look-up table T2 to set a position of the symbol S1 to which each character corresponds in the data block B1 according to the sequence look-up table T2 for generating the data block B1. In this embodiment, the sequence look-up table T2 is a random number table, and the data block generating circuit 120 determines relative positions of symbols to which all characters in the input information $S_{in}$ correspond in the data block B1 according to a group of random numbers derived from the random number table, wherein the data block B1 further includes a plurality of specific symbols for indicating a position of the data block B1. After duplicating the data block B1 repeatedly, the output circuit 130 adds the duplicated data blocks to an image having a document included therein, and outputs an encrypted image $S_{WM}$.

Please refer to FIG. 1 again. The processing circuit 110 includes a symbol unit generating element 111 and a symbol generating element 112. The symbol unit generating element 111 processes each character in the input information $S_{in}$, and applies the conversion look-up table T1 to generate a plurality of symbol units corresponding to each character, wherein the symbol units include a specific symbol unit for indicating locations of the symbol units. Additionally, the symbol generating element 112 generates the symbol S1 corresponding to the character according to the symbol units.

Figure 2:
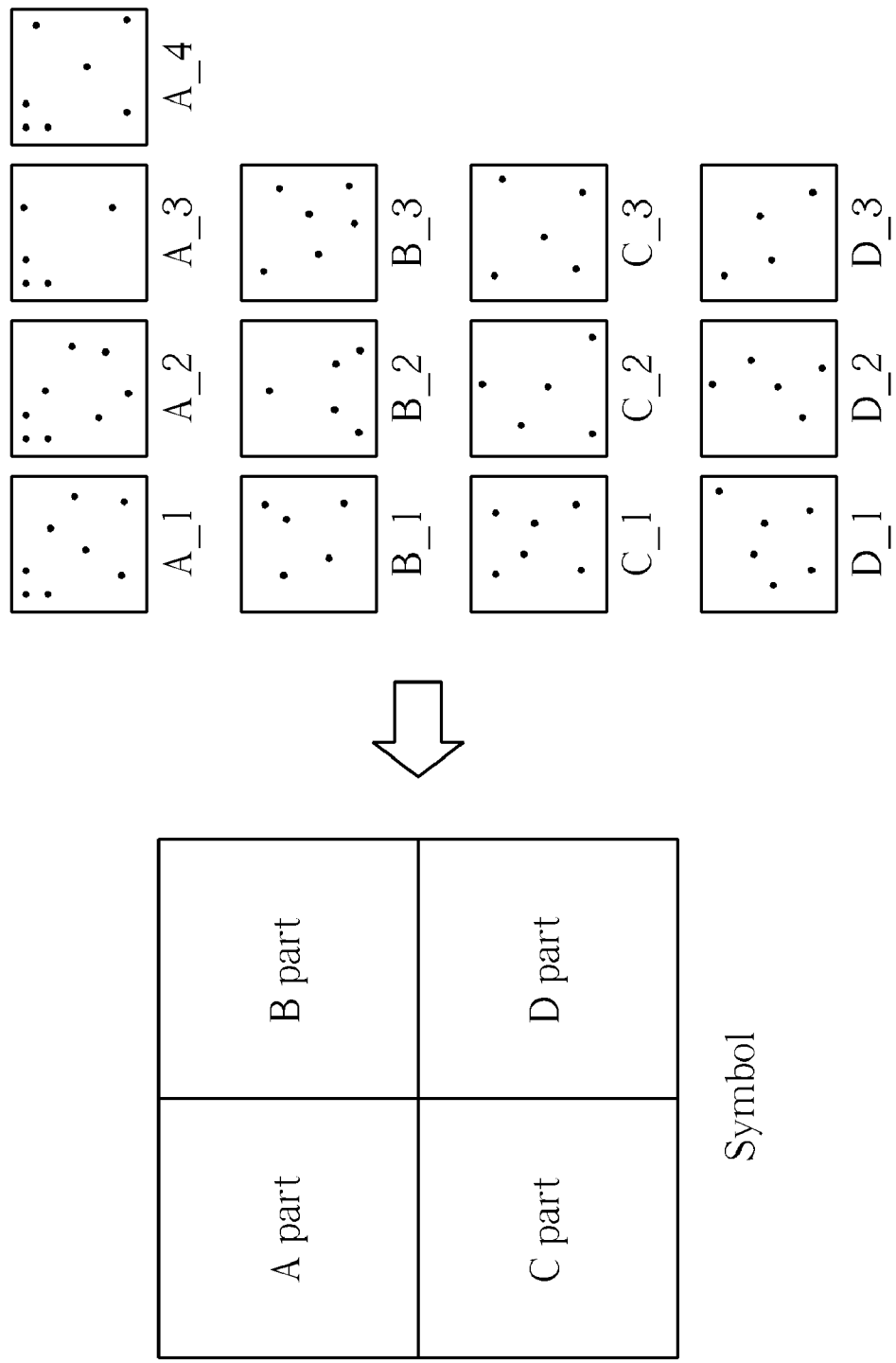
FIG. 2 is a composition diagram of a symbol according to an embodiment of the present invention.
Figure 3:
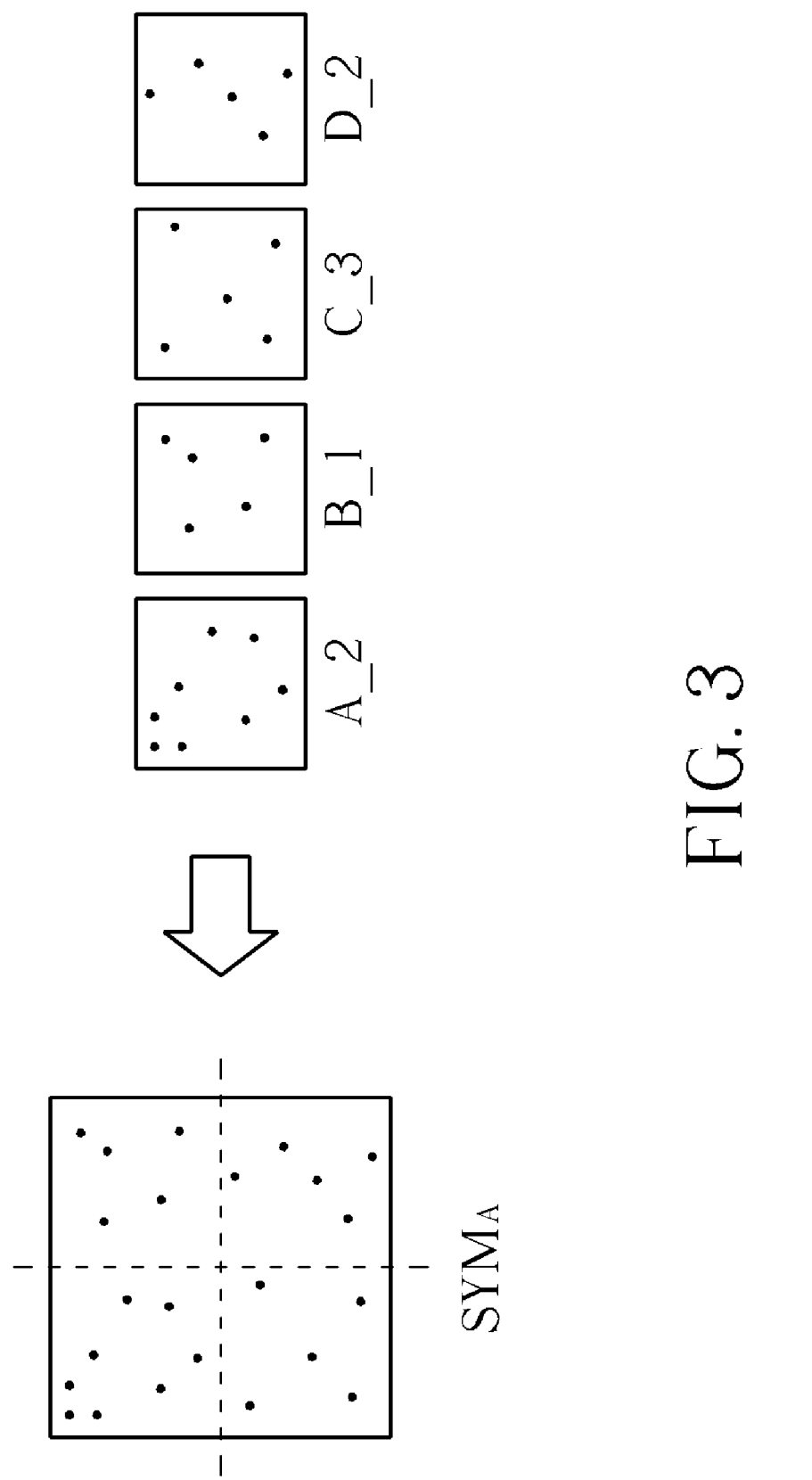
FIG. 3 is a diagram of converting a character "A" within the input information into a symbol according to an embodiment of the present invention.

Please refer to FIG. 2 and FIG. 3 for further details of an operation of the processing circuit 110. FIG. 2 is a composition diagram of a symbol according to an embodiment of the present invention, and FIG. 3 is a diagram of converting a character "A" within the input information $S_{in}$ into a symbol $SYM_A$ according to an embodiment of the present invention. As can be seen from FIG. 2, a symbol is composed of four equal symbol units: an A part at the upper left, a B part at the upper right, a C part at the lower left and a D part at the lower right, wherein each symbol unit has a corresponding code pattern A_1, A_2, A_3, A_4, B_1, B_2, B_3, C_1, C_2, C_3, D_1, D_2, and D_3. Please refer to FIG. 3 again. The symbol unit generating element 111 will first convert a character within the input information $S_{in}$ into a group of codes. In this embodiment, a corresponding code of character "A" is "2132", and the symbol unit generating element 111 will determine symbol units representing 2, 1, 3, 2 (i.e., A_2, B_1, C_3 and D_2 in FIG. 2) at the upper left, upper right, lower left and lower right of a symbol $SYM_A$. The symbol generating element 112 thereby combines A_2, B_1, C_3 and D_2 to synthesize the symbol $SYM_A$ representing character "A". This embodiment utilizes symbol units corresponding to code patterns, A_2, A_3, A_4, B_1, B_2, B_3, C_1, C_2, C_3, D_1, D_2, and D_3. In other embodiments, however, users may choose other codes as the conversion look-up table T1 according to different requirements, and this kind of variation in design also falls within the scope of the present invention.

Figure 4:
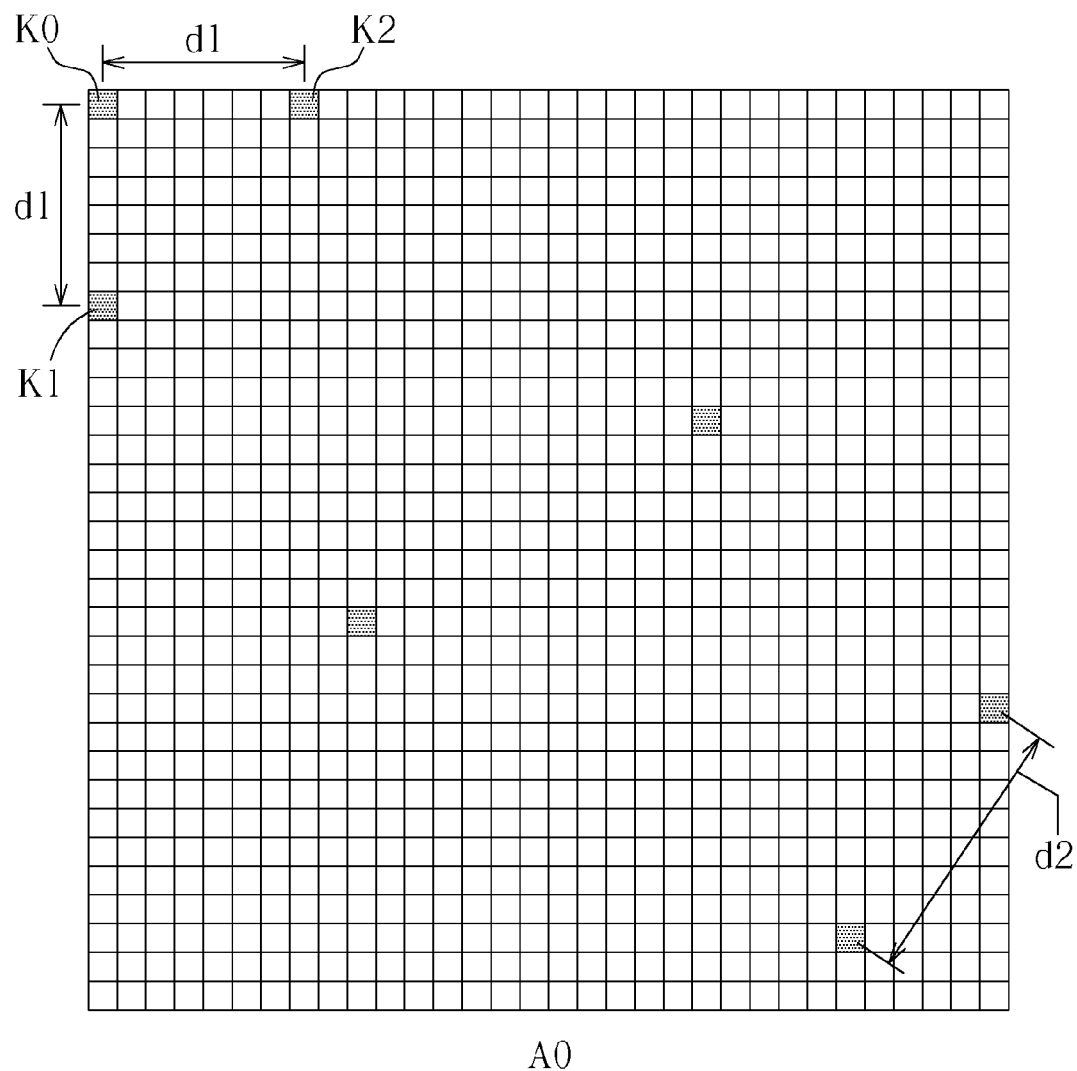
FIG. 4 is a diagram of a symbol unit according to an embodiment of the present invention.

To allow a receiving terminal to position and verify each symbol clearly, the present invention adds a certain prerequisite on the design of symbols and code patterns. In this way, the receiving terminal can verify each symbol without affecting readability of the document. Please refer to FIG. 4, which is a diagram of a symbol unit A0 according to an embodiment of the present invention. In this embodiment, the symbol unit A0 is a pattern with a size of 32 pixels×32 pixels and located at the upper left corner of a symbol (the A part), and the A part is a specific symbol unit having a specific pattern for positioning a location of each symbol. The upper left corner of the symbol unit A0 includes three position marks K0, K1, and K2 for positioning (in this example, one position mark is one pixel), wherein the position mark K0 is located at the most upper left corner of the symbol unit A0, and the position marks K1 and K2 are located at the lower side and the right side of the position mark K0 by a specific distance d1, respectively (in this example, the specific distance d1 equal 7 pixels). Apart from those three position marks, the symbol unit A0 includes four data marks representing the code, wherein the shortest distance between two data marks is designed to be larger than the specific distance d1. For example, the shortest distance d2 between two data marks will be designed to be deliberately more than 7 pixels to prevent those two data marks from being regarded as position marks. Therefore, after identifying the relative locations of the three position marks, the receiving terminal can swiftly determine a relative location of the symbol containing the symbol unit A0, and thereby derive relative locations of all the data marks to determine the code represented by the symbol unit A0. Furthermore, data marks in each symbol unit are designed according to the specific distance d1 to ensure that a distance between two data marks belonging to two neighboring symbol units is larger than the specific distance d1. In this embodiment, a distance between any two data marks is designed to be larger than 9 pixels.

Figure 5:
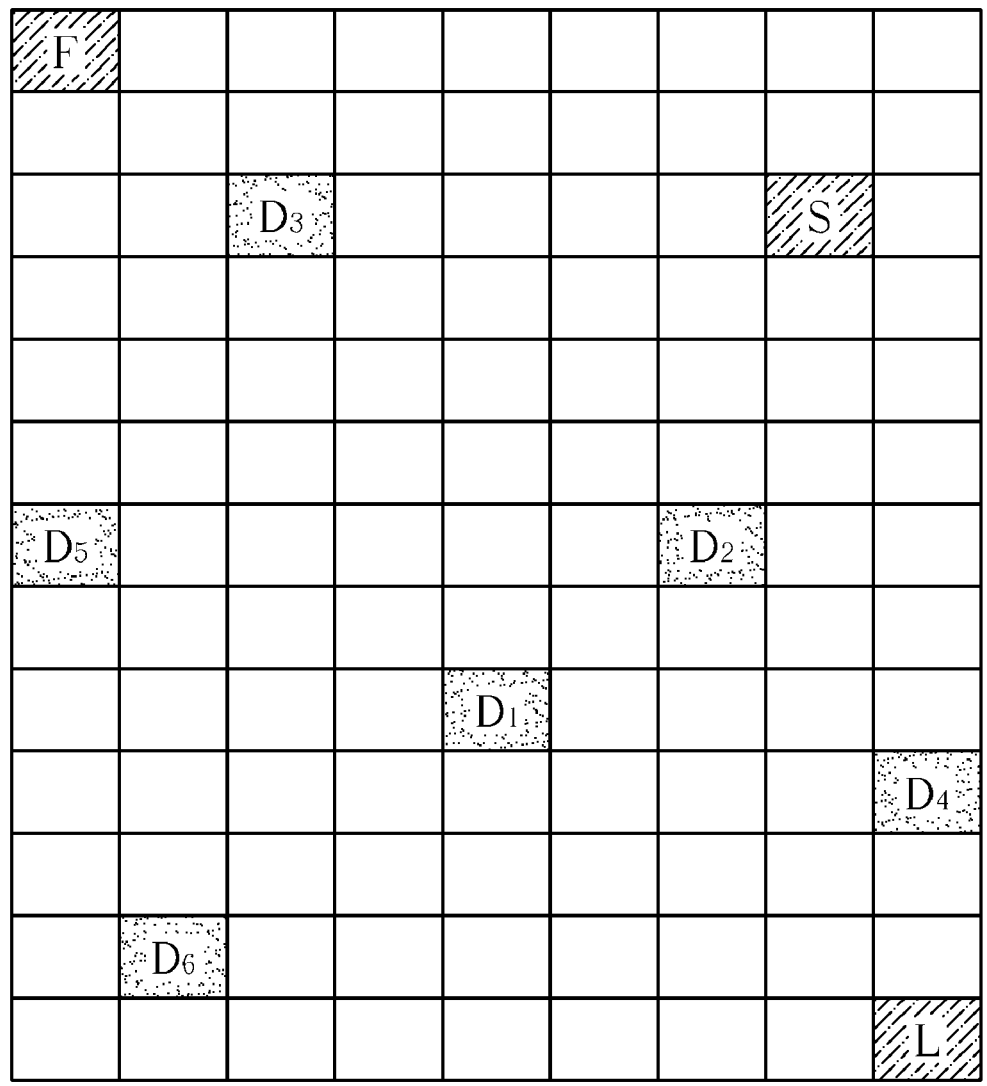
FIG. 5 is a diagram of allocating relative locations of symbols in a data block according to an embodiment of the present invention.

After deriving symbols S1 to which all the characters within the input information $S_{in}$ correspond, the data block generating circuit 120 will utilize a group of random numbers generated from a random seed as the sequence look-up table, and refer to the group of random numbers to determine relative locations of symbols S1 corresponding to all characters within the input information $S_{in}$. Please refer to FIG. 5 for further details of an operation of the data block generating circuit 120. FIG. 5 is a diagram of allocating relative locations of those symbols in the data block according to an embodiment of the present invention. In FIG. 5, the data block comprises 9×13 symbols (i.e., a total of 117 symbols), wherein three specific symbols indicate a location of the data block: a first symbol F at the most upper left corner, a last symbol L at the most lower right corner and a stop symbol S representing an end of information. Via identifying the first symbol F and the last symbol L, the data block generating circuit 120 can verify a size and a location of the data block, and then the data block generating circuit 120 starts from the first symbol F to sequentially allocate the symbol corresponding to each character within the input information $S_{in}$ according to the group of random numbers in the sequence look-up table T2. For example, the first two numbers in the group of random numbers are 76 and 101, the data block generating circuit 120 thereby counts from left to right, starting from the first symbol F, wherein when the right end of each row is reached, the counting continues from the left end of the next row, and the counting is not stopped until the corresponding number (in this case, the corresponding number is 76) is reached; additionally, when the last symbol L at the lower right corner is reached, the counting continues from the first symbol F at the upper left corner, and when the counting is finished, the data block generating circuit 120 allocates the symbol corresponding to the first character at the present location, and searches for a location of the symbol corresponding to the next character from the first symbol F again. In this embodiment, when counting one number 76 from the first symbol F is finished, a location of the first data symbol $D_1$ is derived; similarly, when counting another number 101 from the first symbol F is finished, a location of the second data symbol $D_2$ is derived. In this way, the data block generating circuit 120 allocates locations of 6 data symbols $D_1$, $D_2$, $D_3$, $D_4$, $D_5$, $D_6$ sequentially, and then derives a location of the stop symbol S. The stop symbol S is allocated to thereby indicate that the input information $S_{in}$ is finished. However, the aforementioned counting method is merely for illustrative purposes. In other embodiments, the data block generating circuit 120 may utilize different counting methods to allocate locations of the data symbols. That is, methods of allocating the locations of the symbols with random numbers all fall within the scope of the present invention.

According to the Nyquist sampling theorem, a sampling rate of any sampling system must be two times higher than a highest frequency of a signal to restore the intact signal. For example, if a resolution of 600 dpi (dot per inch) is adopted to convert an input image into electronic signals when deriving information, when an output terminal is outputting the image, a resolution of 300 dpi is required. As a result, in this embodiment, after the output circuit 130 determines the data block B1, an image of the data block B1 is enlarged to double its size and then processed. In addition, in order to prevent the hidden information from being inaccessible due to cutting of the printed document, the output circuit 130 will duplicate the data block B1 many times, separately arrange the duplicated data block B1, and then generate and output the image $S_{WM}$.

Figure 6:
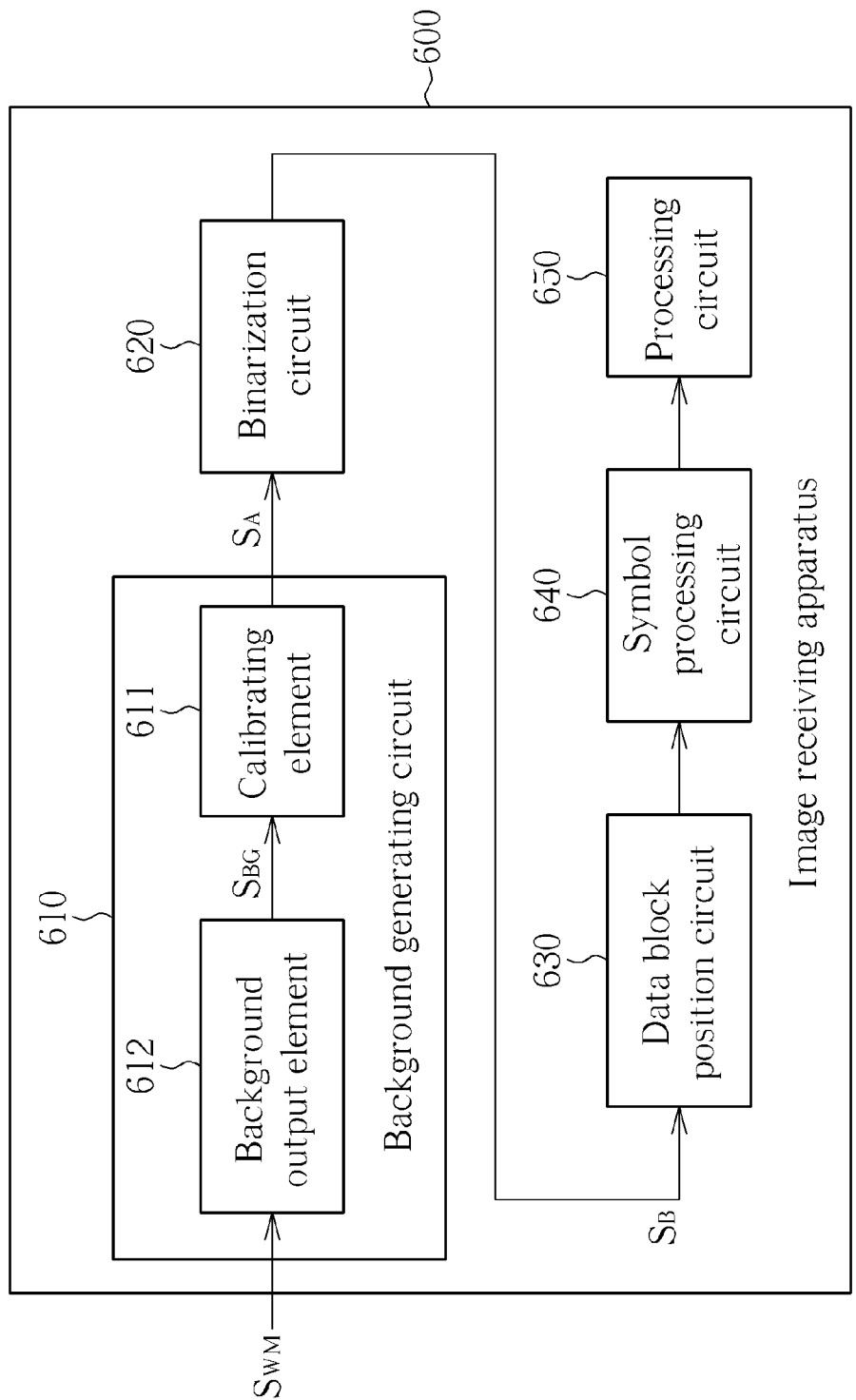
FIG. 6 is a diagram of image receiving apparatus according to an embodiment of the present invention.

Please refer to FIG. 6, which is a diagram of an image receiving apparatus 600 according to an embodiment of the present invention. For convenience, the image receiving apparatus 600 receives and processes the image $S_{WM}$ outputted by the image output apparatus 100. The image receiving apparatus 600 includes a background generating circuit 610, a binarization circuit 620, a data block position circuit 630, a symbol position circuit 640 and a processing circuit 650. The background generating circuit 610 performs a foreground removing procedure for the image $S_{WM}$ to derive a background image $S_{BG}$. The binarization circuit 620 performs a binarization process for a part of the background image $S_{BG}$ to derive a binarized result $S_B$ including a result of binarization of the data block B1. The data block position circuit 630 thereby processes the binarized result $S_B$ to determine a range of the data block B1 according to the specific symbols in the data block B1. The symbol position circuit 640 refers to the identical sequence look-up table T2 (i.e., the group of random numbers generated from the same random seed by the image output apparatus 100) and the specific symbols to derive a symbol sequence of the plurality of symbols to which the input information corresponds. The processing circuit 650 converts the symbols into the corresponding characters according to the identical conversion look-up table T1 and the symbol sequence (i.e., the look-up table utilized by the image output apparatus 100), respectively.

In this embodiment, the image receiving apparatus 600 may be a scanner for scanning an image of a document and then processing the scanned image. However, when the document is being scanned, a skewed scanning position of the document may cause the image receiving apparatus 600 to receive a slanted image, leading to a malfunction of following processes. Therefore, after the image $S_{WM}$ is received, the image $S_{WM}$ is usually required to be further processed to ensure the following processing can be proceed smoothly.

Figure 7:
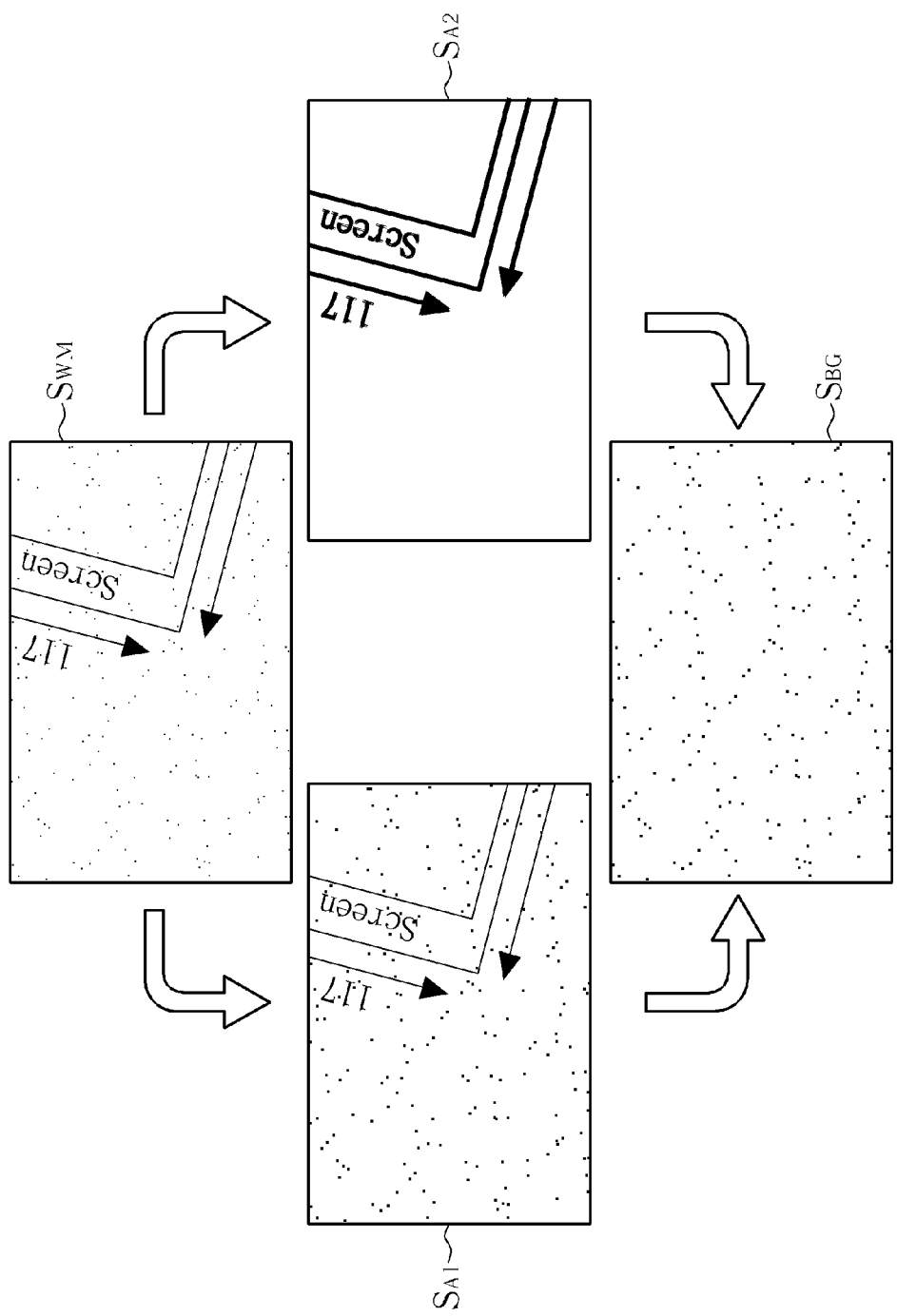
FIG. 7 is a diagram of applying a foreground removing procedure to an image to derive a background image according to an embodiment of the present invention.

Please refer to FIG. 6 again. The background generating circuit 610 includes a calibrating element 611 and a background output element 612. The background output element 612 performs a foreground removing procedure for the image $S_{WM}$ to derive the background image $S_{BG}$. Please refer to FIG. 7 for further details of an operation of the foreground removing procedure. FIG. 7 is a diagram of applying the foreground removing procedure to the image $S_{WM}$ to derive the background image $S_{BG}$ according to an embodiment of the present invention. Firstly, the background output element 612 utilizes a first luminance threshold LTH1 to extract pixels of the image $S_{WM}$ with a luminance lower than the first luminance threshold LTH1, thereby deriving a first luminance image $S_{A1}$; next, the background output element 612 utilizes a second luminance threshold LTH2 to extract pixels of the image $S_{WM}$ with a luminance lower than the second luminance threshold LTH2, and performs a dilation procedure for the extracted pixels to thereby derive a second luminance image $S_{A2}$, wherein the second luminance threshold LTH2 is lower than the first luminance threshold LTH1 (i.e., LTH2<LTH1). By setting the background output element 612 properly, the first luminance image $S_{A1}$ contains the foreground image and the background image, whereas the second luminance image $S_{A2}$ contains the foreground image only. As a result, the background output element 612 will further utilize the second luminance image $S_{A2}$ to eliminate the foreground image within the first luminance image $S_{A1}$ to derive the background image $S_{BG}$.

Figure 8:
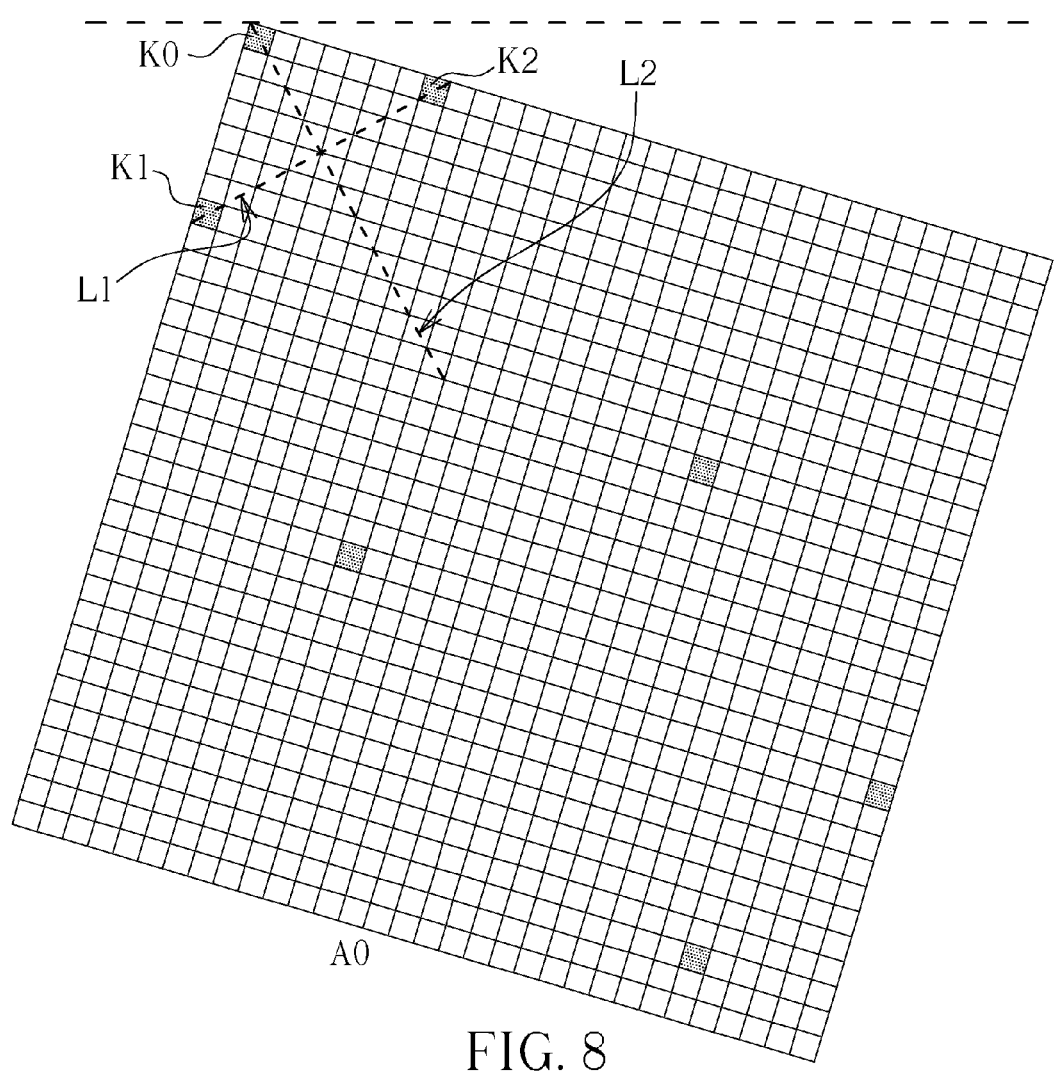
FIG. 8 is a diagram of the symbol unit in FIG. 4 performing a slanting procedure.

The calibrating element 611 calibrates the background image $S_{BG}$ according to specific symbol units in the background image $S_{BG}$, thereby deriving a calibrated image $S_A$. Please refer to FIG. 4 and FIG. 8 simultaneously. FIG. 8 is a diagram of the symbol unit A0 in FIG. 4 performing a slanting procedure. For each symbol in the image $S_{WM}$ (or the background image $S_{BG}$), the specific symbol unit (i.e., the A part) located at the upper left corner comprises three position marks K0, K1 and K2 for positioning. In FIG. 8, a connection line between the position marks K1 and K2 is L1, and a connection line between the position mark K0 and the center of L1 is L2. Generally, when the background image $S_{BG}$ is not askew, a slope of L2 is −45°. However, the slope of L2 in FIG. 8 is −60°. Therefore, via calculating the slope of L2 of each symbol in the background image $S_{BG}$, the calibrating element 611 is able to determine whether to calibrate the background image $S_{BG}$ according to an average of the slopes. For example, when an average slope of connection lines L2 of symbols in the background image $S_{BG}$ is −60°, the calibrating element 611 will rotate the background image $S_{BG}$ counterclockwise by 15° to generate the calibrated image $S_A$. In this way, it is ensured that a properly positioned image is processed by the following procedures.

Figure 9:
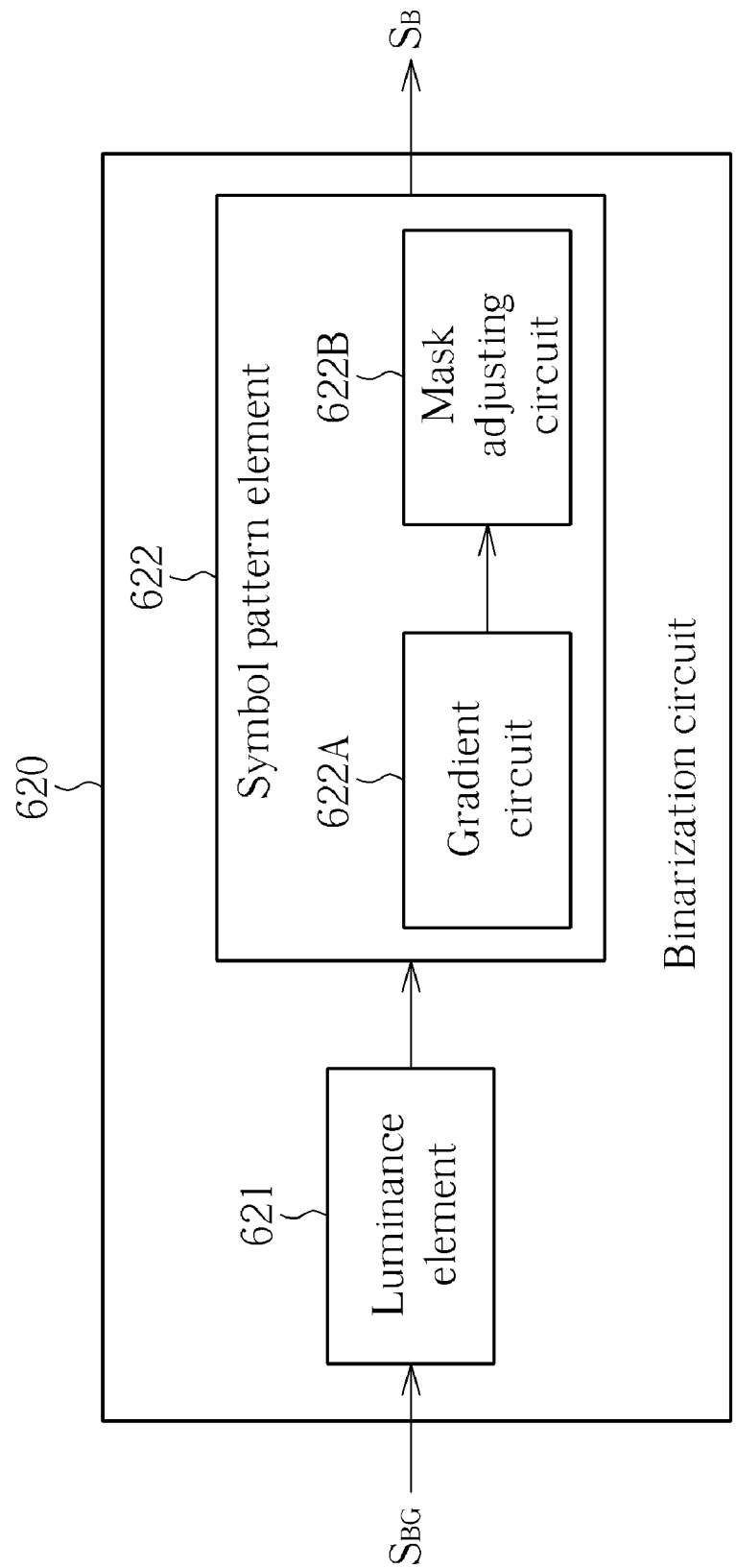
FIG. 9 is a diagram of a binarization circuit according to an embodiment of the present invention.

Please refer to FIG. 9 for further details of an operation of the binarization circuit 620 in FIG. 6. FIG. 9 is a diagram of the binarization circuit 620 according to an embodiment of the present invention. The binarization circuit 620 includes a luminance element 621 and a symbol pattern element 622.

The luminance element 621 processes each symbol in the background image $S_{BG}$ to derive a luminance threshold TH according to the specific symbol units of the symbol. For example, in this embodiment, the luminance element 621 will process the position marks K0, K1 and K2 to derive 27 pixels with the lowest luminance, and calculate a luminance average as the luminance threshold according to an average of the 27 pixels. In this way, a malfunction due to uneven illumination on the image can be avoided.

As the data block B1 in the image $S_{WM}$ is an enlarged image, the image receiving apparatus 600 must further restore the data block B1 back to the original resolution for the following processing. Therefore, the symbol pattern element 622 utilizes a mask M and the luminance threshold TH to search for luminance information of each pixel, and derives symbol patterns of all symbols within the data block B1, wherein the symbol pattern element 622 includes a gradient element 622A and a mask adjusting element 622B. Since the image output apparatus 100 outputs the data block B1 (which has an original resolution of 600 dpi) with a resolution of 300 dpi in this embodiment, each symbol is enlarged two times larger, so the symbol pattern element 622 utilizes a mask M with a size of 2 pixels×2 pixels to restore the data block B1.

Figure 10:
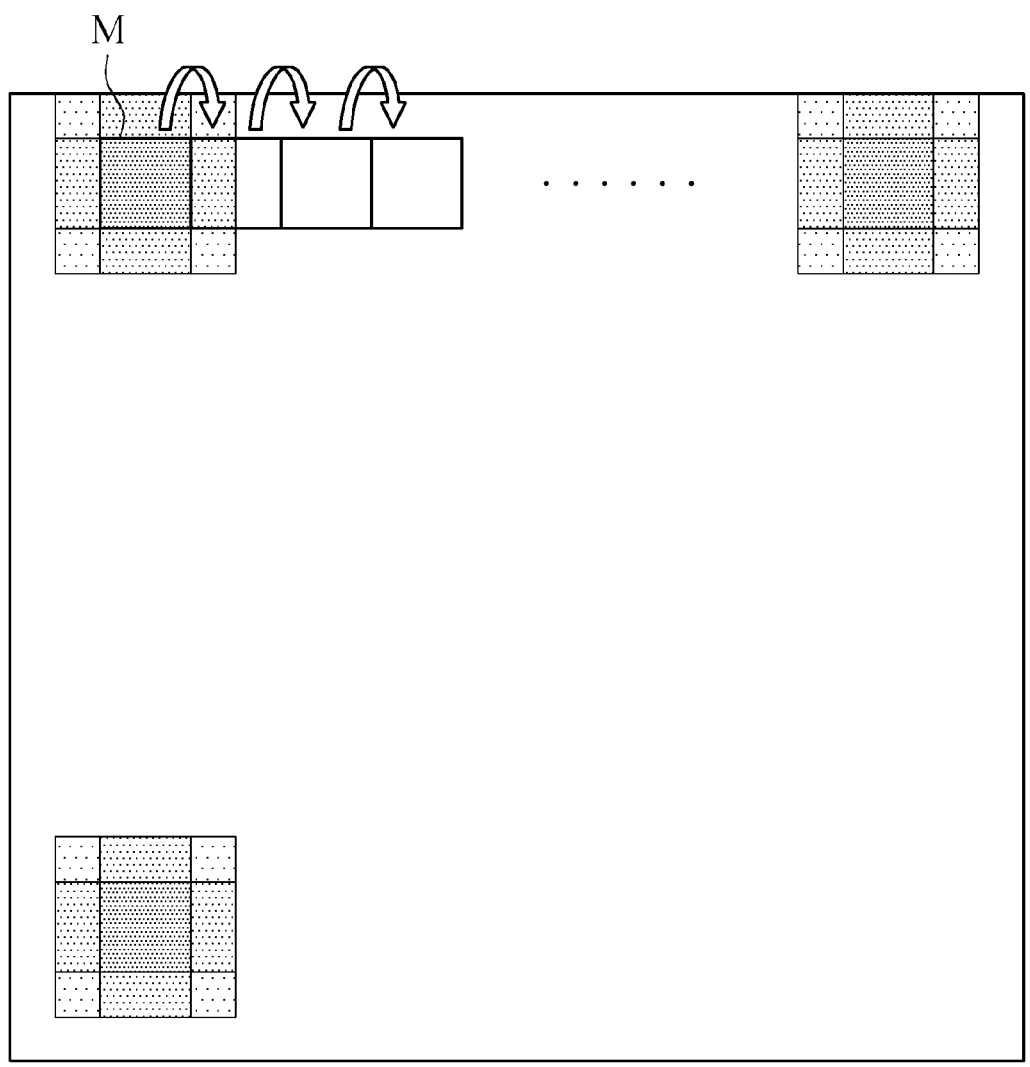
FIG. 10 is a diagram of the symbol pattern element utilizing a mask to process a background image according to an embodiment of the present invention.
Figure 11:
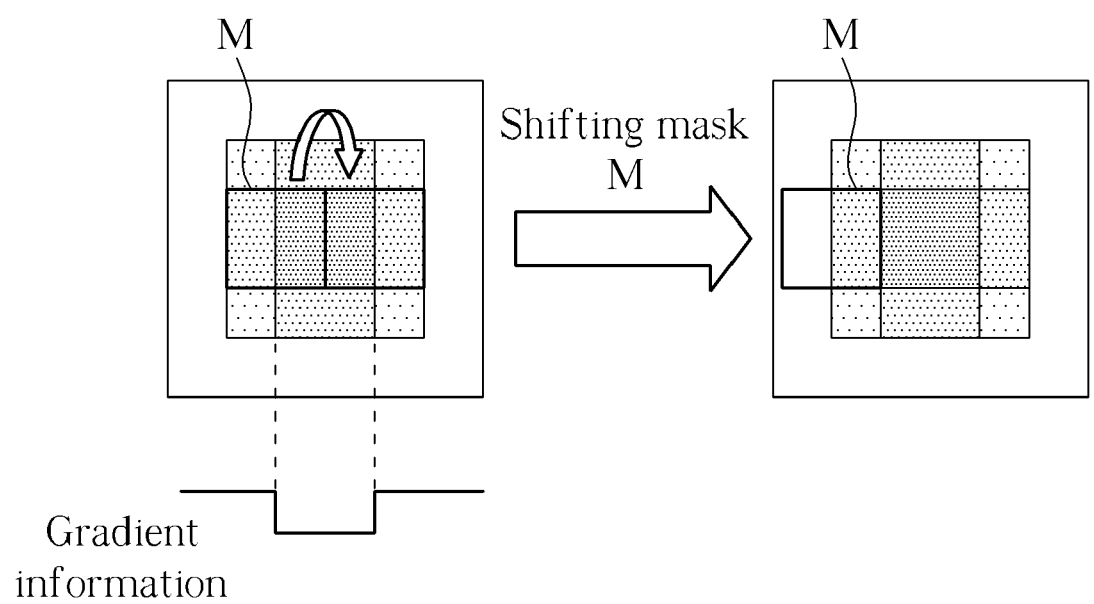
FIG. 11 is a diagram of a mask adjusting element detecting gradient information from a mask to selectively adjust a location of the mask according to an embodiment of the present invention.

Please refer to FIG. 10 for further details of an operation of the symbol pattern element 622 in FIG. 9. FIG. 10 is a diagram of the symbol pattern element 622 utilizing the mask M to process the background image $S_{BG}$ according to an embodiment of the present invention. As shown in FIG. 10, the symbol pattern element 622 applies the mask M to sequentially collect pixel luminance of each symbol in the background image $S_{BG}$ to restore the data block B1 to the original resolution. However, in the processing of restoring data block B1, the restoring procedure may fail due to a wrong initial location of the mask M. Therefore, the symbol pattern element 622 still requires another mechanism to properly restore the data block B1. The gradient element 622A will derive a plurality of gradient information according to variation of luminance information collected by the mask M, and the mask adjusting element 622B will selectively shift the mask M according to the gradient information. Please refer to FIG. 11, which is a diagram of the mask adjusting element 622B detecting gradient information from the mask M to selectively adjust the location of the mask M according to an embodiment of the present invention. In FIG. 11, the gradient element 622A will derive the gradient information according to two pieces of luminance information collected by the mask M continuously. As can be known from FIG. 11, the original location of the mask M is one pixel offset from the proper location, thus it can be verified from the gradient information that two serious gradient variations occur at centers of sampling locations of the mask M, and the directions of both gradient variations are opposite to each other. The mask adjusting element 622B determines that the location of the mask M needs to be adjusted and therefore shifts the mask M by one pixel. In this way, a distortion in the restoring result of the data block B1 can be avoided. After the location of the mask M is verified, the symbol pattern element 622 will sequentially apply the mask M and the luminance threshold TH to restore the background image $S_{BG}$ into the binarized result $S_B$ of the data block B1. When an average luminance within the mask M is lower than the luminance threshold TH, it indicates that the image within the mask M should be restored as a black pixel; on the other hand, when an average luminance within the mask M is higher than the luminance threshold TH, it indicates that the image within the mask M should be restored as a white pixel. In this way, the binarized result $S_B$ of the data block B1 can be derived.

After the aforementioned processing is accomplished, the data block position circuit 630 shown in FIG. 6 can determine a range of the data block B1 according to the specific symbols (the first symbol F at the upper left corner, and the last symbol L at the lower right corner) in the data block B1. The symbol position circuit 640 derives a symbol sequence of the symbols corresponding to the input information $S_{in}$ according to the sequence look-up table T2 (the one used by the image output apparatus 100) and the specific symbols. As the procedure of searching the symbol sequence is substantially identical to the data block generating circuit 120 in the image output apparatus 100, further description is omitted here for brevity. The processing circuit 650 converts the symbols into the corresponding characters according to the conversion look-up table T1 (the one used by the image output apparatus 100) and the symbol sequence, respectively. That is, the processing circuit 650 will verify symbol units of each symbol, and drive a character corresponding to the symbol according to the codes to which the symbol units correspond. Further detail is omitted here for brevity.

Figure 12:
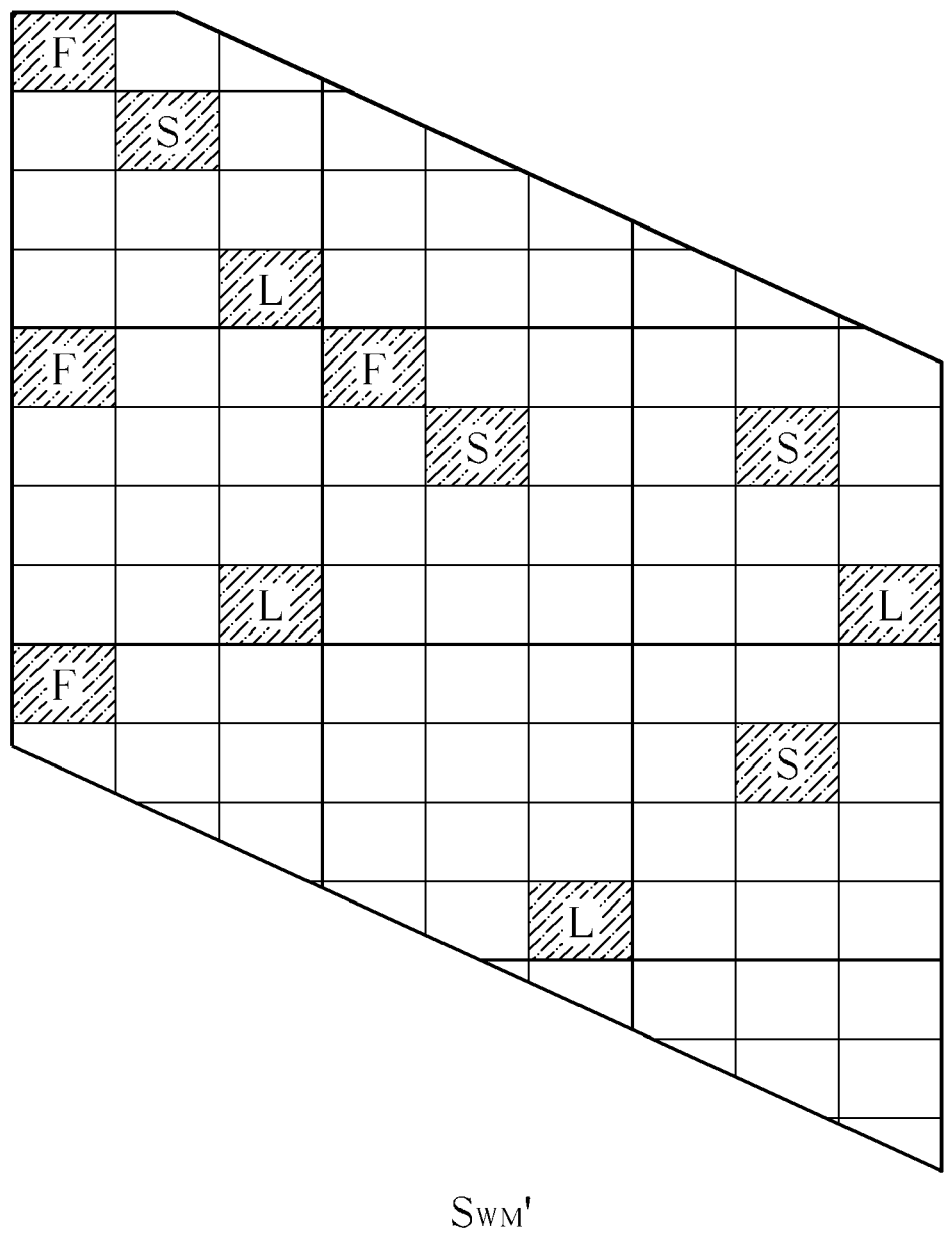
FIG. 12 is a diagram of a cut document image according to an embodiment of the present invention.

Please refer to FIG. 12 again. FIG. 12 is a diagram of a cut document image $S_{WM}'$ according to an embodiment of the present invention. The cut document image $S_{WM}'$ has many repeated data blocks, wherein the intact data block has the specific symbols: the first symbol F, the last symbol L and the stop symbol S. As can be seen from FIG. 12, some data blocks in the cut document image $S_{WM}'$ are not complete but, via collecting multiple data blocks and information in each specific symbol, the data receiving apparatus 600 is still able to derive the intact information.

Briefly summarized, the present invention provides an easy and quick method and apparatus thereof, which are capable of embedding information in an input image of a document and deriving the information from the input image of the document. In a case where a symbolic watermark design employs specific symbol patterns, the document image can be calibrated and the hidden information can be derived swiftly and correctly during the document scanning.

Those skilled in the art will readily observe that numerous modifications and alterations of the device and method may be made while retaining the teachings of the invention.

What is claimed is:

1. A method of embedding information in an input image, the information comprising a plurality of characters, the method comprising:
   utilizing a processing circuit to receive the information and convert each character included in the information into a corresponding symbol according to a conversion look-up table, comprising:
      for each character in the information:
      applying the look-up table to generate a plurality of symbol units corresponding to the character, wherein the symbol units comprise a specific symbol unit for indicating locations of the symbol units; and
      generating the symbol corresponding to the character according to the symbol units;
   setting a position of the corresponding symbol of each character in a data block according to a sequence look-up table and accordingly generating the data block; and
   adding at least the data block to the input image.

2. The method of claim 1, wherein the symbol is a watermark.

3. The method of claim 1, wherein the specific symbol unit comprises a plurality of positioning marks composed according to a specific distance and a specific pattern.

4. The method of claim 1, wherein each symbol unit comprises a plurality of marks composed according to a specific distance.

5. A method of embedding information in an input image, the information comprising a plurality of characters, the method comprising:
- utilizing a processing circuit to receive the information and convert each character included in the information into a corresponding symbol according to a conversion look-up table;
- setting a position of the corresponding symbol of each character in a data block according to a sequence look-up table which is a random number table and accordingly generating the data block, comprising:
  - determining relative positions of symbols to which all characters in the information correspond in the data block according to a group of random numbers generated from the random number table, wherein the data block further comprises a plurality of specific symbols for indicating a position of the data block; and
- adding at least the data block to the input image.

6. A method of extracting information from an input image, the information comprising a plurality of characters, the input image comprising at least one data block, the data block comprising a plurality of symbols, each symbol comprising a specific symbol unit for indicating a position of the symbol, the data block comprising a plurality of specific symbols for indicating a position of the data block, the method comprising:
- performing a foreground removing procedure for the input image to derive a background image;
- determining a range of the data block in the background image according to the specific symbols;
- deriving a symbol sequence of the symbols corresponding to the information according to a sequence look-up table and the specific symbols; and
- utilizing a processing circuit to convert the symbols into the corresponding characters according to a conversion look-up table and the symbol sequence, respectively.

7. The method of claim 6, wherein the data block is a result of performing a binarization process for a part of the background image.

8. The method of claim 7, wherein the binarization process comprises:
- for each symbol in the background image:
- deriving a luminance threshold according to the specific symbol unit of the symbol; and
- utilizing a mask and the luminance threshold to search for a luminance information corresponding to the symbol and accordingly deriving a symbol pattern corresponding to the symbol; and
- the step of determining the range of the data block in the background image according to the specific symbols comprises:
- determining the range of the data block according to a plurality of symbol patterns to which the specific symbols correspond.

9. The method of claim 8, wherein the binarization process further comprises:
- deriving a plurality of gradient information according to a plurality of luminance information searched by the mask; and
- selectively shifting the mask according to the plurality of gradient information.

10. The method of claim 6, wherein the step of performing the foreground removing procedure for the input image to derive the background image comprises:
- calibrating the input image according to at least one specific symbol unit to derive a calibrated image; and
- performing the foreground removing procedure for the calibrated image to derive the background image.

11. An apparatus of embedding information in an input image, the information including a plurality of characters, the apparatus comprising:
- a processing circuit, for receiving the information and converting each character included in the information into a corresponding symbol according to a conversion look-up table, comprising:
  - a symbol unit generating element, for processing each character in the information, and applying the conversion look-up table to generate a plurality of symbol units corresponding to the character, wherein the symbol units comprise a specific symbol unit for indicating locations of the symbol units; and
  - a symbol generating element, coupled to the symbol unit element, for generating the symbol corresponding to the character according to the symbol units;
- a data block generating circuit, coupled to the processing circuit, for setting a position of the corresponding symbol of each character in a data block according to a sequence look-up table and accordingly generating the data block; and
- an output circuit, coupled to the data block generating circuit, for adding at least the data block to the input image.

12. The apparatus of claim 11, wherein the symbol is a watermark.

13. The apparatus of claim 11, wherein the specific symbol unit includes a plurality of positioning marks composed according to a specific distance and a specific pattern.

14. The apparatus of claim 11, wherein each symbol unit comprises a plurality of marks composed according to a specific distance.

15. An apparatus of embedding information in an input image, the information including a plurality of characters, the apparatus comprising:
- a processing circuit, for receiving the information and converting each character included in the information into a corresponding symbol according to a conversion look-up table;
- a data block generating circuit, coupled to the processing circuit, for setting a position of the corresponding symbol of each character in a data block according to a sequence look-up table and accordingly generating the data block; and
- an output circuit, coupled to the data block generating circuit, for adding at least the data block to the input image;
- wherein the data block generating circuit determines relative positions of symbols to which all characters in the information correspond in the data block according to a group of random numbers generated from the random number table, wherein the data block further comprises a plurality of specific symbols for indicating a position of the data block.

16. An apparatus of extracting information from an input image, the information comprising a plurality of characters, the input image comprising at least one data block, the data block comprising a plurality of symbols, each symbol comprising a specific symbol unit for indicating a position of the symbol, the data block comprising a plurality of specific symbols for indicating a position of the data block, the apparatus comprising:

a background generating circuit, for performing a foreground removing procedure for the input image to derive a background image;

a data block position circuit, coupled to the background generating circuit, for determining a range of the data block in the background image according to the specific symbols;

a symbol position circuit, coupled to the data block generating circuit, for deriving a symbol sequence of the symbols corresponding to the information according to a sequence look-up table and the specific symbols; and a processing circuit, coupled to symbol position circuit, for converting the symbols into the corresponding characters according to a conversion look-up table and the symbol sequence, respectively.

17. The apparatus of claim 16, further comprising:
a binarization circuit, for performing a binarization process for a part of the background image to derive the data block.

18. The apparatus of claim 17, wherein the binarization circuit processes each symbol in the background image and comprises:

a luminance element, for deriving a luminance threshold according to the specific symbol unit of the symbol; and a symbol pattern element, coupled to the luminance element, for utilizing a mask and the luminance threshold to search for a luminance information corresponding to the symbol to derive a symbol pattern corresponding to the symbol; and the data block position circuit comprises:
a determining circuit, for determining the range of the data block according to a plurality of symbol patterns to which the specific symbols correspond.

19. The apparatus of claim 18, wherein the binarization circuit further comprises:

a gradient element, for deriving a plurality of gradient information according to a plurality of luminance information searched by the mask; and a mask adjusting element, coupled to the gradient element, for selectively shifting the mask according to the plurality of gradient information.

20. The apparatus of claim 16, wherein the background generating circuit comprises:

a calibrating element, for calibrating the input image according to at least one specific symbol unit to derive a calibrated image; and a background output element, coupled to the calibrating element, for performing the foreground removing procedure for the calibrated image to derive the background image.

* * * * *